United States Patent [19]

Anspach et al.

[11] Patent Number: 5,494,501
[45] Date of Patent: Feb. 27, 1996

[54] LUBRICANT SEPARATOR FOR A PNEUMATIC TOOL LUBRICATION SYSTEM

[75] Inventors: Thomas D. Anspach, Palm Beach Gardens; Eddy H. del Rio, Royal Palm Beach, both of Fla.

[73] Assignee: The Anspach Effort, Inc., Palm Beach Gardens, Fla.

[21] Appl. No.: 199,905

[22] Filed: Feb. 22, 1994

[51] Int. Cl.$^6$ .................................................. B01D 19/00
[52] U.S. Cl. .................. 96/208; 96/214; 96/217; 96/219; 96/220; 55/330; 55/337
[58] Field of Search ............................ 96/204, 206, 208, 96/211, 214, 216, 217, 219, 220; 55/320, 330, 337, 391

[56] References Cited

U.S. PATENT DOCUMENTS

| | | | |
|---|---|---|---|
| 2,467,408 | 4/1949 | Semon | 55/330 X |
| 3,257,783 | 6/1966 | Baker et al. | 55/320 X |
| 3,269,097 | 8/1966 | German | 55/337 |
| 3,339,350 | 9/1967 | Sims | 55/320 |
| 3,378,993 | 4/1968 | Veres et al. | 55/337 X |
| 3,418,789 | 12/1968 | Hoffman et al. | 55/337 X |
| 3,447,290 | 6/1969 | Flory | 55/337 X |
| 3,845,840 | 11/1974 | Thrasher | 55/337 X |
| 4,441,871 | 4/1984 | Boller | 55/320 X |
| 4,666,473 | 5/1987 | Gerdau | 55/320 X |
| 5,053,126 | 10/1991 | Krasnoff | 55/320 X |

FOREIGN PATENT DOCUMENTS

| | | | |
|---|---|---|---|
| 1068221 | 11/1959 | Germany | 55/320 |
| 0225343 | 7/1985 | Germany | 55/320 |
| 0952292 | 8/1982 | U.S.S.R. | 55/320 |

*Primary Examiner*—Robert Spitzer
*Attorney, Agent, or Firm*—Quarles & Brady

[57] ABSTRACT

Lubricant in exhaust fluid from a pneumatic motor is extracted by a separator. The separator comprises a housing in which a cyclonic flow of the exhaust is created to expel the lubricant in the exhaust. The exhaust is directed through a turbine within the housing wherein lubricant is deposited on blades of the turbine and then expelled against a housing wall by rotation of the turbine. After passing through the turbine blades, the exhaust flow is forced to reverse direction thereby extracting additional lubricant due to centrifugal force. After the lubricant has been extracted, the exhaust flows through a filter to remove other particles before exiting the separator.

8 Claims, 5 Drawing Sheets

5,494,501

LUBRICANT SEPARATOR FOR A PNEUMATIC TOOL LUBRICATION SYSTEM

BACKGROUND OF THE INVENTION

This invention relates to systems for lubricating a pneumatically-driven surgical tool used in medical operations, and more particularly to systems which introduce lubricants into the compressed airflow which drives the motor.

Different types of surgical tools are driven by compressed air to avoid electrical sparks in a potentially combustible environment of the operating room. The pneumatic motors of such surgical instruments are lubricated via a device that introduces a preset amount of lubricant into the compressed air flow that operates the pneumatic motor. After passing through the motor, the compressed air typically is exhausted into the operating room environment carrying with it the lubricant.

The expulsion of the lubricant with the exhaust air contaminated the environment of the medical operating room. Such contaminants not only may affect the personnel performing an operation, but can be carried into the surgical opening of the patient. In addition, the expulsion of the lubricant after passing through the motor wastes lubricant that otherwise could be recycled back to the device that adds it to the compressed air flowing to the motor.

SUMMARY OF THE INVENTION

An object of the present invention is to provide a device for efficiently extracting lubricant from a fluid flow, such as exhaust from a pneumatically driven tool. Such extraction reduces the amount of lubricant expelled into the environment of the tool and permits recycling of the lubricant.

Another object is to provide a dynamic mechanism that aids in extracting lubricant through the use of a moving member upon which the lubricant in the tool exhaust strikes.

The lubricant separator according to the present invention includes a housing having an internal chamber with a tubular partition extending from one end to separate the chamber into inner and outer regions. A fluid inlet opens into outer region in a manner that creates a cyclonic flow of the fluid within the chamber which acts to expel lubricant against a wall of the housing. An air outlet communicates with the inner region.

A turbine is rotatably mounted within the chamber adjacent to another end of the tubular partition so that the cyclonic flow of fluid causes the turbine to rotate. In the preferred embodiment, the turbine comprises a disk having blades extending from a central portion of the disk with the cyclonic flow of fluid that exits the outer region passing between the blades. Impingement of the fluid with the blades separates the lubricant from the fluid flow and rotation of the turbine expels the separated lubricant against the wall of the housing. The central portion of the disk has plurality of apertures through which the fluid passes to enter the inner region of the chamber after flowing through the blades. The fluid flow reverses direction between the blades and the apertures thus creating a centrifugal force which separates additional lubricant.

A filter is located within the chamber so that fluid flow in the inner region passes through the filter before entering the air outlet. The filter removes other particles from the fluid flow.

DETAILED DESCRIPTION OF THE INVENTION

Figure 1:
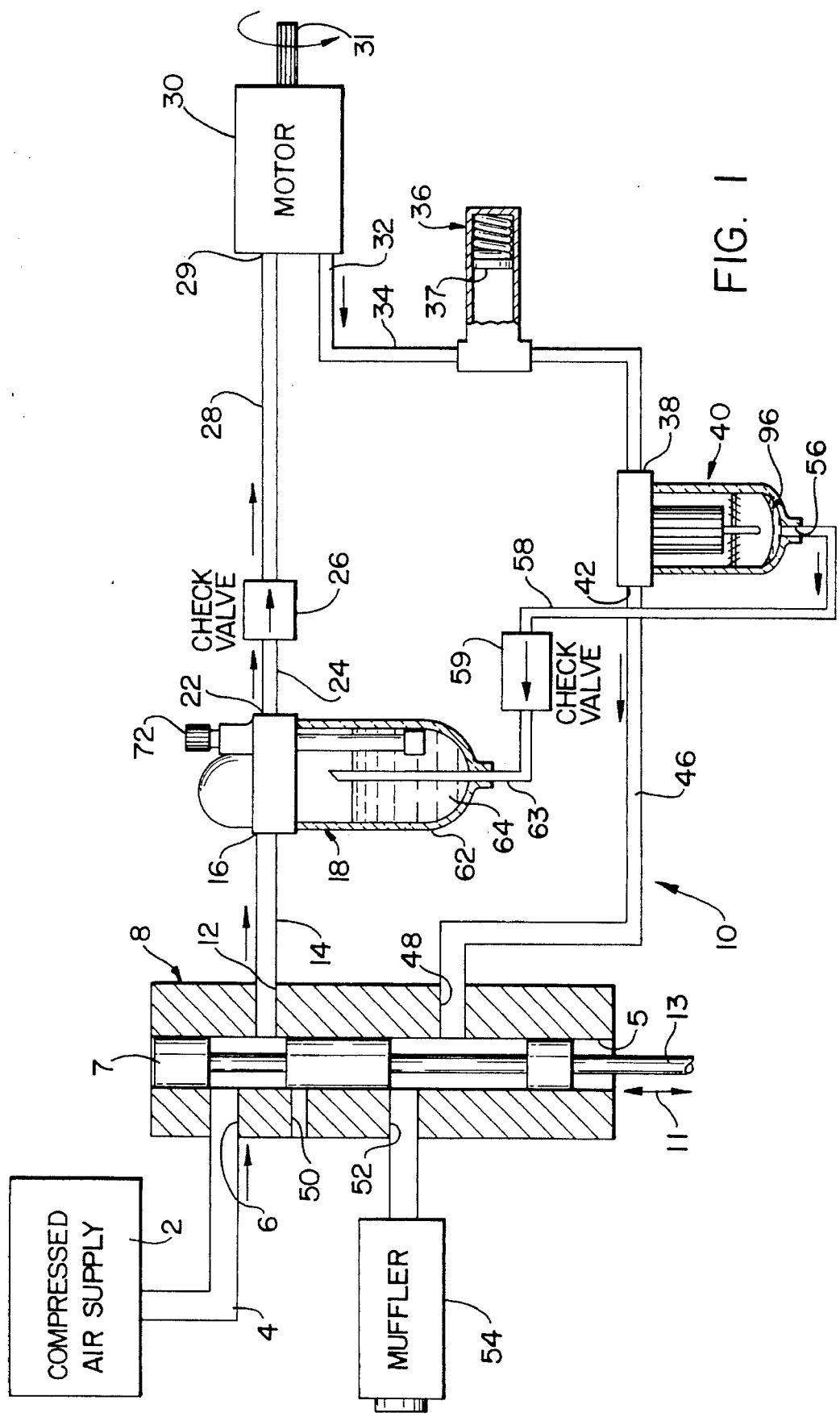
FIG. 1 is a schematic of a pneumatic tool lubricating system according to the present invention with the control valve in the on position.

With initial reference to FIG. 1, a lubrication system 10 for lubricating a pneumatic operated device, such as motor 30, receives air from a compressed air supply 2 which may be a conventional air compressor or a compressed air tank if portable operation is desired. The compressed air from supply 2 is directed through conduit 4 to an inlet 6 of a dual air control valve 8. Specifically, the inlet 6 communicates with longitudinal bore 5 through the valve within which is located a valve piston 7. The piston 7 moves within the bore 5 in directions indicated by arrow 11 to turn on and off the motor 30 being driven by the compressed air.

With the dual air valve 8 in the "on" state, the position of piston 7, as shown in FIG. 1, allows air to flow from the inlet 6 through bore 5 exiting through an outlet 12. A conduit 14 couples the air flowing from the outlet 12 to an inlet 16 of a lubricator 18. Arrows with single heads in the drawings indicate the direction of fluid flow.

Figure 3:
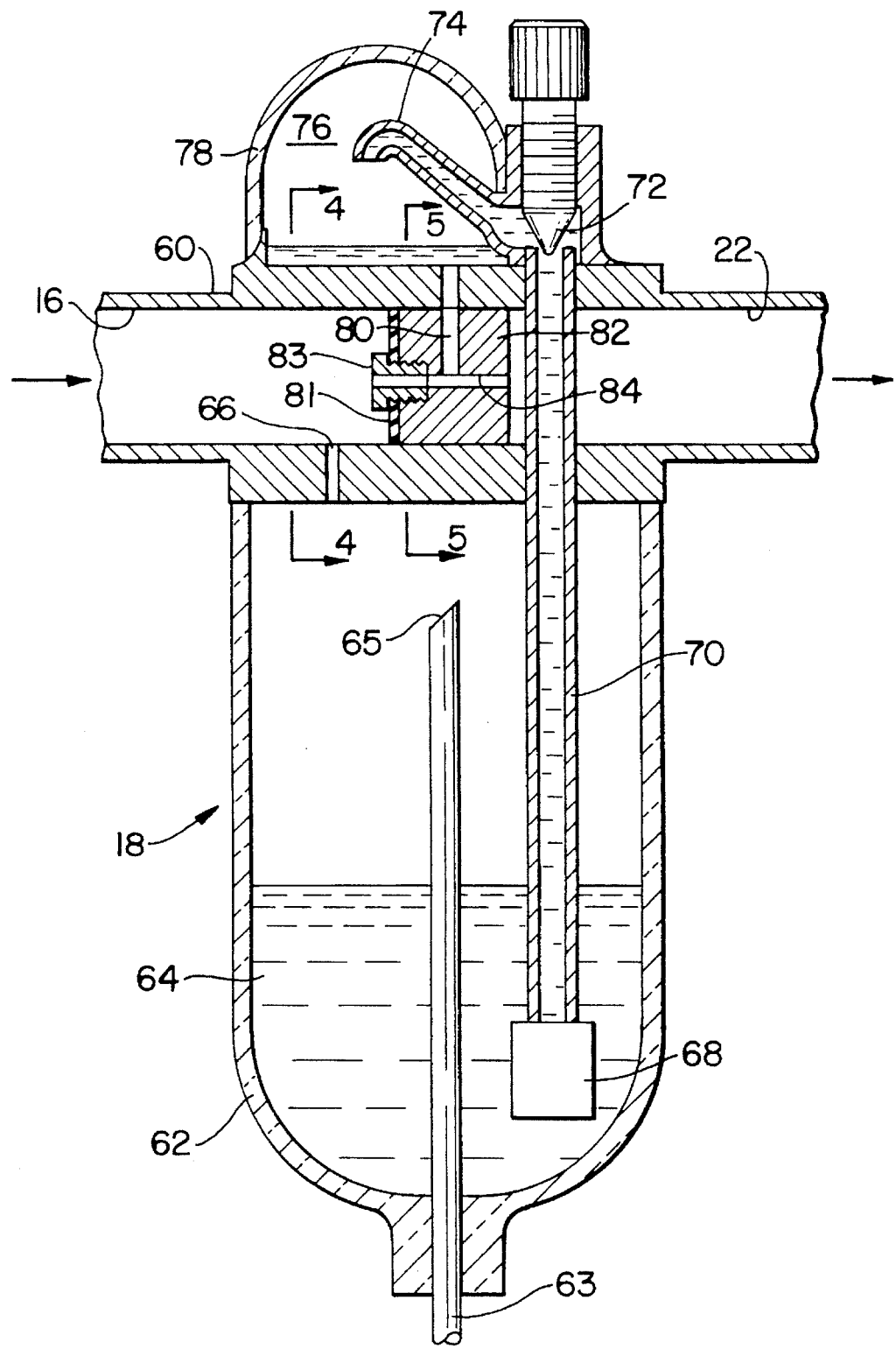
FIG. 3 is a cross sectional view through the lubricator of the system in FIG. 1.

With reference to FIGS. 1 and 3, the lubricator 18 contains a housing 60 to which is attached a reservoir 62 formed of a clear plastic material enabling the user to observe the level of the lubricant 64 therein. As compressed air enters the lubricator 18 through inlet 16, a portion of the air flow is directed through a lubricant pressurizing orifice 66 and downward into the reservoir 62. This flow of compressed air exerts pressure on the upper surface of the lubricant 64, forcing the lubricant through a filter 68 and upward through feed tube 70. At the upper end of feed tube 70 is a needle control valve 72 which is threaded into an aperture through lubricator housing 60. By controlling the relationship of the tip of the needle valve 72 with the upper opening of feed tube 70, the amount of lubricant flowing through the tube can be controlled, thereby regulating the feed rate at which lubricant is introduced into the air flow through the lubricator 18. The lubricant flows past the needle valve 72 through a drip spout 74 and into a supply chamber 76 which is formed by a dome 78 attached to the upper surface of lubricator housing 60.

Figure 5:
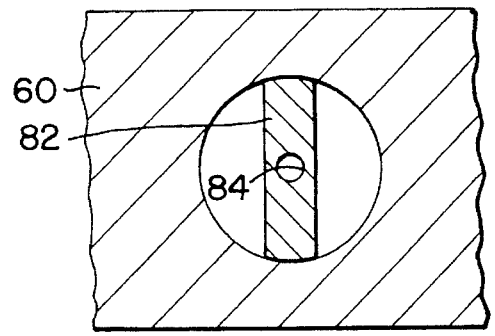
FIG. 5 is a cross sectional view taken along line 5—5 in FIG. 3.

The lubricant from supply chamber 76 flows downward through a supply passage 80 in the lubricator housing 60 and into a venturi body 82 located the central one-third of the passage between inlet 16 and outlet 22, as shown in FIG. 5.

Figure 4:
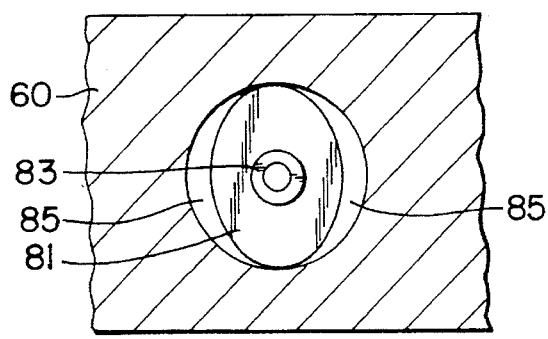
FIG. 4 is a cross sectional view taken along line 4—4 in FIG. 3.

The venturi body 82 has a mixing orifice 84 therethrough to which the supply passage 80 communicates. A disk-shaped resilient diaphragm 81 is attached to the inlet side of venturi body 82 by a hollow bolt 83 threaded into the mixing orifice 84. As the compressed air flows into the inlet 16, the diaphragm 81 is folded around the venturi body 82 opening passages 85 on either side of the body as shown in FIG. 4. Some of the air flows through the mixing orifice 84 drawing lubricant through supply passage 80 which becomes mixed with the air as it continues to flow toward the outlet 22. The lubricant flows from the supply chamber 76 through passage 80 as a result of both gravity and the Bernoulli effect produced by orifice 84 in the venturi body 82.

A pressure differential is produced on opposite sides of the diaphragm 81 which results in air flowing downward through orifice 66 into the reservoir 62. The orifice 66 has a relatively small cross-section so that the flow of compressed air does not sputter the lubricant supply 64.

Referring again to FIG. 1, the air-lubricant mixture is directed through the outlet 22 of the lubricator 18 into conduit 24 and through a first one-way check valve 26. The first check valve 26 prevents the air-lubricant mixture from flowing backwards into the lubricator 18 when the valve 8 is placed in the "off" state, as will be described. The lubricated air mixture then flows through conduit 28 which is connected to the inlet port 29 of the pneumatic motor 30, such as used in a pneumatically-operated surgical tool. The air-lubricant mixture drives and lubricates the internal components of the pneumatic motor 30, producing rotation of a shaft 31. The air-lubricant mixture then exits the pneumatic motor 30 through an exhaust port 32 and flows into conduit 34.

An accumulator 36 is located in conduit 34 between the motor 30 and a lubricant separator 40. The accumulator has a spring loaded diaphragm 37 which is compressed to increase the volume of the accumulator chamber in response to increases in the back air pressure from the separator 40.

Figure 6:
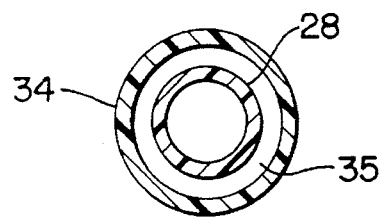
FIG. 6 is a transverse cross sectional view through a coaxial pneumatic hose which carries air to and from the motor in FIG. 1.

For convenience, the inlet and outlet conduits 28 and 34 for the motor 30 may be a single coaxial hose structure shown in FIG. 6. The air inlet conduit 28 is a centrally-located tube within the hose and the outlet conduit 34 is coaxially around the inlet conduit forming a gap 35 therebetween through which the exhaust from the motor 30 passes. In the preferred embodiment, the material which forms the outer wall of exhaust conduit 34 is a flexible rubber which expands and contracts with increases and decreases in the pressure of the exhaust. In this type of hose structure, the separate accumulator device 36 can be dispensed with since the elasticity of the outer wall of conduit 34 provides a mechanism by which the volume for the air between the motor and the separator 40 changes with rise and fall of the pressure.

Figure 8:
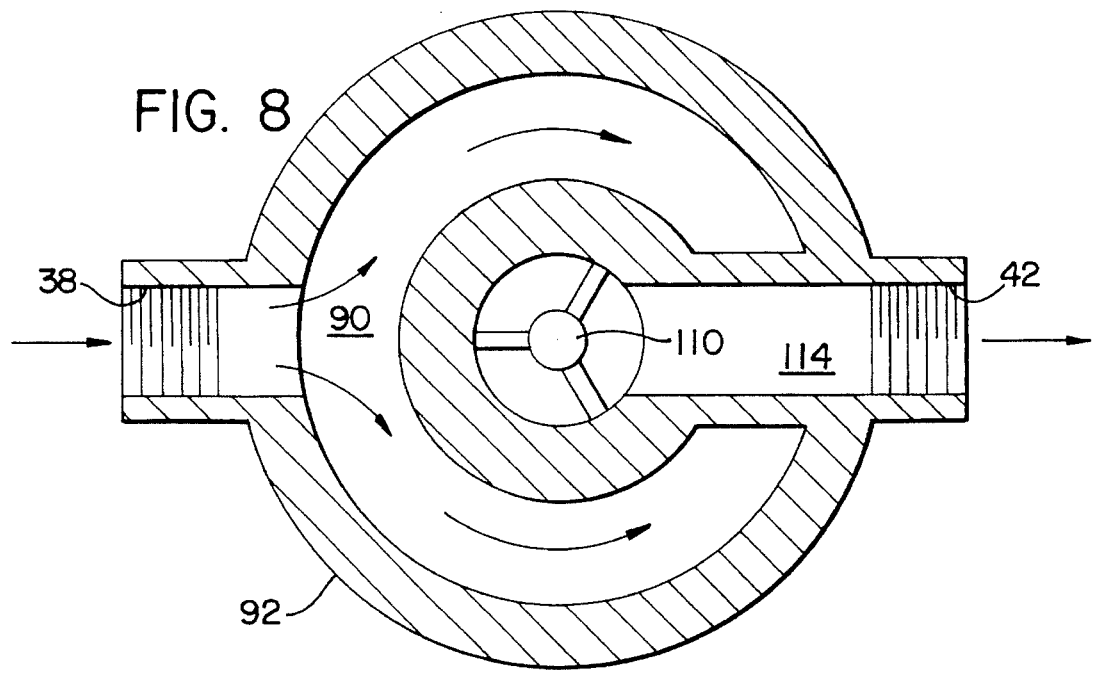
FIG. 8 is a cross sectional view taken along line 8—8 in FIG. 7.
Figure 7:
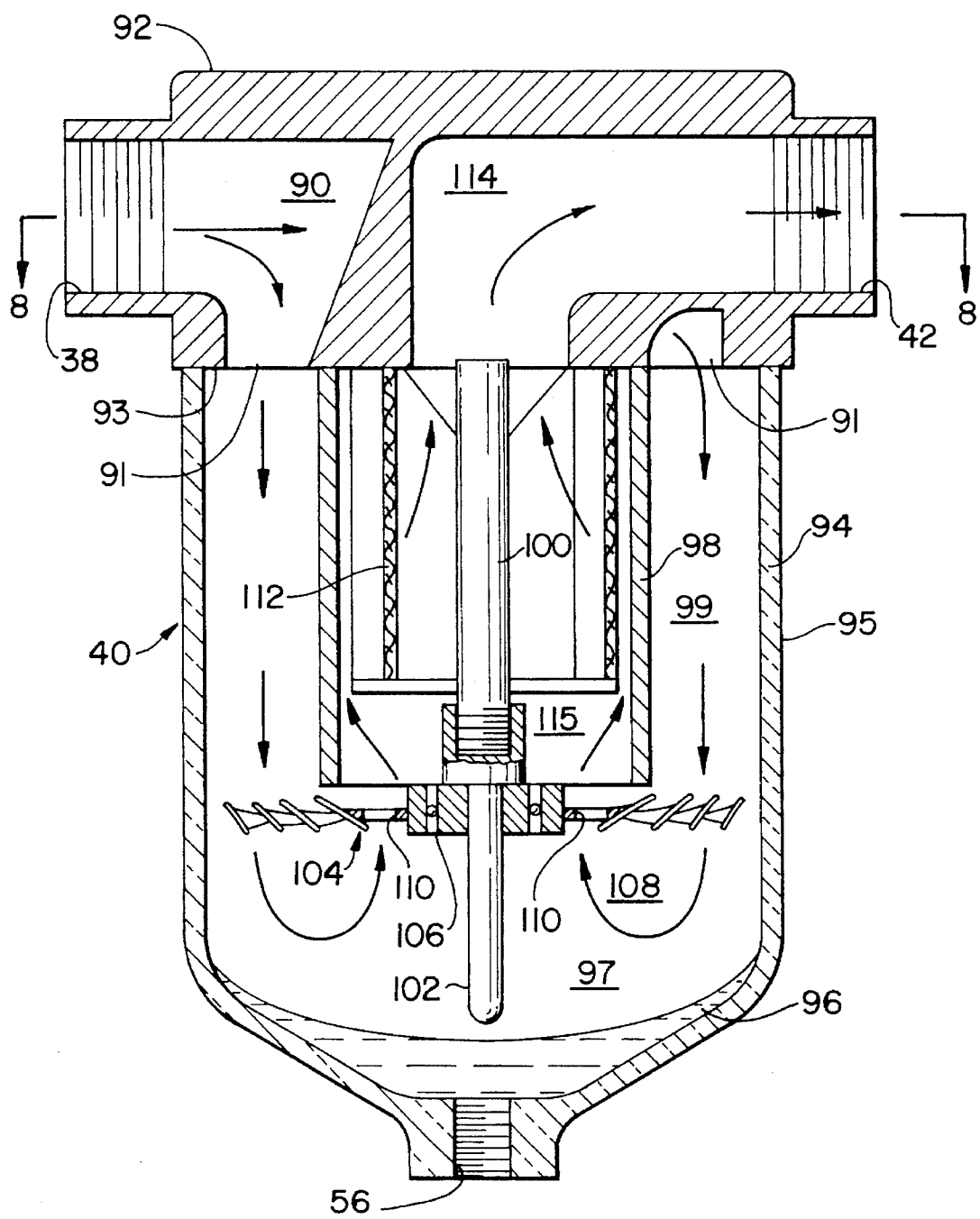
FIG. 7 is a cross sectional view through the lubricant separator of the lubricating system.

The tool exhaust continues flowing into the inlet opening 38 of the lubricant separator 40 which removes the lubricant from the exhaust. As shown in FIGS. 7 and 8, the air-lubricant mixture of the tool exhaust enters the inlet opening 38 and is directed into a circular, inlet passage 90 formed in the body 92 of the separator 40. The exhaust is forced by the curved passage walls into a cyclonic flow path through an annular opening 91 in the lower surface 93 of the body 92 and downward into a bowl 94 which extends from the body. The body and bowl form the housing of the separator. A tubular partition 98 is attached to the lower surface 93 of body 92 inside the annular opening 91 and projects into a cavity 97 in the bowl 94. An annular chamber 99 is defined in cavity 97 between the partition 98 and the wall 95 of the bowl 94 through which the exhaust flow is directed downward into the bowl in a cyclonic path. The cyclonic flow path forces the lubricant particles against the wall 95 causing extraction from the air flow. The lubricant, which is extracted from the air flow by centrifugal force, flows down the inner surface of wall 95 and forms a pool 96 at the bottom of the bowl.

The separator body 92 has a central post 100 which projects downward into the bowl cavity 97 and has a threaded section at its remote end. A shaft 102 is threaded onto the remote end of post 100 and a turbine 104 is mounted on a bearing 106 that is press fitted onto the shaft. The bearing 106 allows the turbine 104 to rotate about the shaft in a horizontal plane in the orientation of the separator 40 shown in FIG. 7. As the compressed air-lubricant mixture flows downward through the bowl 94, it strikes blades 108 on the outer periphery of the disk-shaped turbine 104. The blades 108 direct the air-lubricant mixture at an angle producing a rotation of the turbine 104 about shaft 102. The impingement of the air-lubricant mixture with the turbine blades 108 deposits lubricant on the blade surfaces and the rotary action of the turbine expels the lubricant against the inner wall 95 of the bowl.

After flowing downward through the spinning turbine blades, the exhaust reverses direction flowing upward through openings 110 in the central portion of the turbine 104 from which portion the blades 108 extend. The 180° turn of the fluid flow expels additional lubricant into the pool 96 at the bottom of the bowl 94. The openings 110 are intermittently spaced circumferentially around this central portion so that the exhaust flow at any given point adjacent shaft 102 is periodically interrupted by solid ribs of the central portion of the turbine 104. This periodic interruption of the air flow creates additional turbulence that aids in lubricant separation from the exhaust air.

As the compressed exhaust air flows upward through the central portion of the turbine 104, it enters the inner region 115 within partition 98 and passes through a conventional filter 112 which removes particulates from the air flow. The air then is directed toward the center post 100 of the upper body 92 and re-enters the body 92 through a central opening 115 that is coaxially within the annular opening 91. The central opening 115 in the lower surface 93 of the body 92 opens into an outlet passage 114 which communicates with the outlet opening 42. Thus the exhaust air enters the outlet passage 114 through central opening 115 and exits the separator 40 through the outlet opening 42.

Referring once again to FIG. 1, the air flows from outlet 42 of separator 40 through conduit 46 into an exhaust inlet 48 of the dual air valve 8. In the "on" position of piston 7, the air entering the exhaust inlet 48 flows through the inner bore 5 to an exhaust outlet 52 that is connected to a conventional muffler 54. The air exits the muffler being exhausted into the ambient environment of the operating room.

The recovered lubricant 76 which collects at the bottom of the separator bowl 94 is forced by the air pressure in cavity 97 through a fluid outlet 56 in the bottom of the bowl and through conduit 58. The recovered lubricant flows through a second one-way check valve 59 and a tube 63 that passes through an opening in the bottom of the reservoir 62 of the lubricator 18. The second check valve 59 prevents lubricant from being drawn from the lubricator 18 through tube 63 should a pressure reversal occur. As shown in detail in FIG. 3, tube 63 extends into the bowl 62 of the lubricator 18 and terminates in the upper section of the bowl at an open end 65. The recovered lubricant is ejected from the open end 65 and flows downward into the lubricant pool 64 in the lower section of the reservoir. Introducing the recovered lubricant into the upper section of the reservoir 62 which is normally filled with air, avoids variation of the hydrostatic pressure of the lubricant, which otherwise might occur if the lubricant was ejected directly into the bottom of the lubricant pool 64. This recycling of the lubricant which is recovered by separator 40 replenishes the lubricant supply in lubricator 18. It has been found that over ninety percent of the lubricant passing through the motor 30 can be recovered by the separator 40 and returned to the supply reservoir 62 of the lubricator 18.

Figure 2:
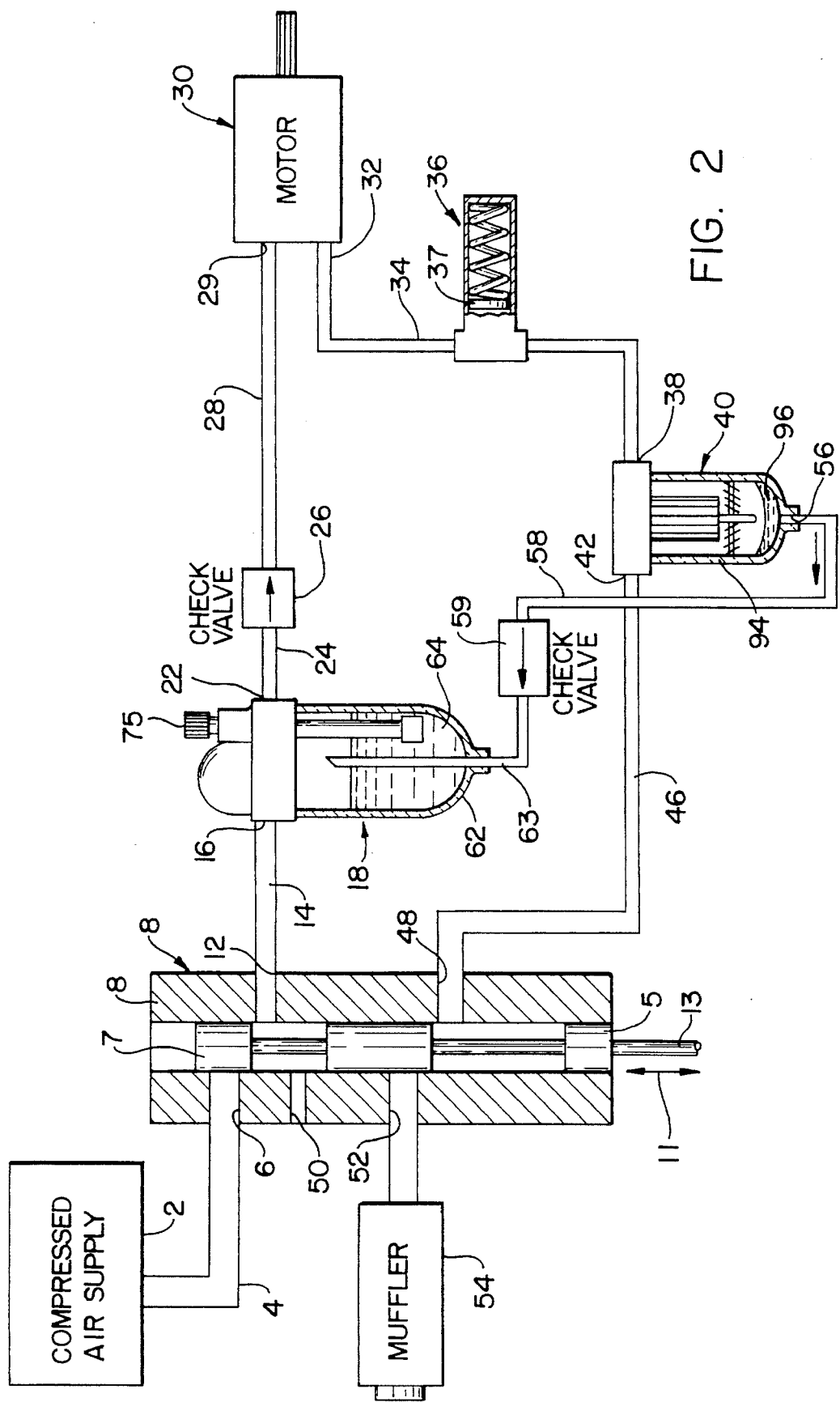
FIG. 2 is a schematic diagram similar to FIG. 1 with the control valve in the off position.

With reference to FIG. 2, when the valve 8 is placed in the "off" position, an enlarged portion of the piston 7 closes the opening between inlet 6 and the bore 5 of the valve. This action terminates the flow of compressed air from supply 2 to the lubricator 18, thus stopping movement of motor 30. Another enlarged portion of the piston 7 blocks the opening between the exhaust outlet 52 and the central bore 5 of the valve 8 in the "off" position, preventing air from flowing from the separator 40 to the muffler. In this state, the pressure within the exhaust conduit 34 and accumulator 36 is released through the separator 40 by forcing recovered lubricant 76 through conduit 58, the second check valve 59 and tube 63 into the reservoir 62 of the lubricator 18. This action returns a significant amount of the remaining recovered lubricant to the lubricator 18 when the motor is turned off. This return action is aided by the position of valve piston 7 opening a passage through bore 5 between the air outlet 12 and an open relief port 50. Thus, the air pressure in the upper sections of the lubricator 18 is released through this passage in the dual air valve 8 providing a reduced pressure that aids in the return of lubricant to the lubricator. It should be noted that the first check valve 26 in this state prevents the air pressure in the motor from being released directly through the lubricator 18 rather than through the separator 40.

We claim:

1. A separator for extracting lubricant from a fluid flow comprising:

a housing having an internal chamber with a tubular partition extending from one end to separate the chamber into inner and outer regions, an inlet which opens into outer region in a manner that creates a cyclonic flow of fluid entering the chamber through the inlet, and an air outlet in communication with the inner region;

a turbine rotatably mounted within the chamber below another end of the tubular partition remote from said one end, said turbine extending across said another end so that flow of fluid between the outer and inner regions passes twice through said turbine and wherein the flow of fluid causes rotation of said turbine; and a filter within the inner region and through which the fluid passes before entering the air outlet.

2. The separator as recited in claim 1 wherein said turbine comprises a disk having blades extending from a central portion of the disk with the cyclonic flow of fluid passing between the blades; and the central portion of said disk having a plurality of apertures extending therethrough through which fluid flows to enter the inner region.

3. A separator for extracting lubricant from exhaust emitted by a pneumatic device, said separator comprising:

a body having an inlet passage that creates a cyclonic flow of fluid through an annular opening in a surface of said body, and having an outlet passage with an opening coaxially located with respect to the annular opening;

a bowl extending from the surface of said body and surrounding the annular opening, said bowl having an outlet for lubricant extracted from the exhaust;

a tubular partition extending from the surface of said body with one end attached to said body between the annular opening and the opening of the outlet passage; and a turbine rotatably mounted within said bowl below said outlet passage opening and extending across said outlet passage opening, wherein fluid flowing from the annular opening into said bowl produces rotation of said turbine.

4. The separator as recited in claim 3 wherein said turbine comprises a disk having blades extending from a central portion of the disk with the cyclonic flow of fluid passing between the blades; and a plurality of apertures extending through the central portion of said disk.

5. The separator as recited in claim 3 wherein said body further comprises a post extending into said tubular partition and said turbine being rotationally attached to the post.

6. The separator as recited in claim 5 wherein said turbine is rotationally attached to the post by a bearing.

7. The separator as recited in claim 6 further comprising a filter attached to the post within said tubular partition, wherein air flowing into the outlet passage passes through said filter.

8. The separator as recited in claim 3 further comprising a filter within said tubular partition wherein air flowing into the outlet passage passes through said filter.

* * * * *